(12) United States Patent
Yin et al.

(10) Patent No.: US 7,079,557 B1
(45) Date of Patent: Jul. 18, 2006

(54) INTRACAVITY OPO LASER

(75) Inventors: Yusong Yin, Stonybrook, NY (US); Nan Yin, Stonybrook, NY (US); Frank F. Wu, Centereach, NY (US)

(73) Assignee: Phtonics Industries Int'l, Bohemia, NY (US)

( * ) Notice: Subject to any disclaimer, the term of this patent is extended or adjusted under 35 U.S.C. 154(b) by 248 days.

(21) Appl. No.: 10/677,826

(22) Filed: Oct. 2, 2003

(51) Int. Cl.
 *H01S 3/10* (2006.01)
(52) U.S. Cl. .......................... 372/22; 372/21; 359/330
(58) Field of Classification Search .............. 372/22, 372/21; 359/330
See application file for complete search history.

(56) References Cited

U.S. PATENT DOCUMENTS

| | | | |
|---|---|---|---|
| 5,936,983 A * | 8/1999 | Yusong et al. ............. | 372/22 |
| 6,088,379 A | 7/2000 | Owa et al. | |
| 6,108,356 A * | 8/2000 | Yin .......................... | 372/22 |
| 6,240,111 B1 | 5/2001 | Kubota et al. | |
| 2002/0080841 A1* | 6/2002 | Yin et al. .................. | 372/75 |
| 2004/0179559 A1* | 9/2004 | Butterworth et al. ...... | 372/21 |

* cited by examiner

*Primary Examiner*—Minsun Harvey
*Assistant Examiner*—Ernest Unelus (74) *Attorney, Agent, or Firm*—James A. Quinton

(57) ABSTRACT

A laser having an optical parametric oscillator for providing a preselected wavelength beam is provided. A nonlinear crystal cut for phase matching condition preferably cut for noncritical phase matching conditions for the fundamental beam wavelength and the preselected wavelength beam is located in both the optical parametric oscillator cavity and laser resonator cavity.

The optical axis of the laser resonator and the optical axis of the optical parametric oscillator cavity are at least partially separate and partially overlap. The laser crystal is located in the laser resonator cavity but not in the optical parametric oscillator cavity. Each end of the OPO nonlinear crystal that intersects the optical axes has a Brewster cut for both the fundamental and preselected wavelength beams so that the fundamental and preselected wavelength beams incident on the nonlinear crystal at approximately the Brewster angle and pass through without substantial reflection loss.

The fundamental wavelength beam is directed into the optical parametric oscillator cavity and incidents on nonlinear crystal having a Brewster cut at each end for fundamental and preselected wavelength beam without substantial reflection loss. A portion of the fundamental wavelength beam is partially converted to a preselected wavelength beam. The fundamental beam and the preselected wavelength beams are reflected back through the nonlinear crystal. Preselected wavelength beam is separated from the fundamental wavelength beam.

56 Claims, 4 Drawing Sheets

INTRACAVITY OPO LASER

FIELD OF THE INVENTION

The invention relates to lasers having an optical parametric oscillator.

BACKGROUND OF THE INVENTION

Optical parametric oscillators (OPO) are known in the prior art. See: U.S. Pat. Nos. 6,108,356 and 5,841,798. Prior art OPO devices can have limited useful lifetimes due to coating failure on the OPO crystal. In addition, prior art OPO devices often have power limitations. The damage threshold of the crystal and crystal coatings limits the amount of power that can be produced. On the other hand, the laser threshold of the OPO crystal limits low power applications. As a result, there is a need in the art for improved optical parametric oscillators particularly lasers that can produce eyesafe wavelength beams.

The subject invention also relates to lasers where the final output wavelength is 193 nm. In many fields such as lithography (metrology of 193 nm stepper lenses), calibration of precision DUV spectrometers, mask inspection, there is a need for low powered 193 nm lasers. Generally complex Ti:sapphire lasers have been used to provide low power lasers having a wavelength of 193 nm for these applications. Typically such lasers are complicated and require two lasing crystals lasing at different wavelengths. See for example U.S. Pat. Nos. 6,088,379 and 6,240,111. Thus there is a need for simple lasers that can provide 193 nm beams.

SUMMARY OF THE INVENTION

According to the invention, a method and an apparatus for producing a laser beam having a preselected wavelength using an optical parametric oscillator is provided. A laser resonator cavity is formed between two reflective surfaces, preferably mirrors. A lasing medium is located within the laser resonator cavity for generating a fundamental wavelength beam. An optical parametric oscillator cavity is formed between two reflective surfaces. A nonlinear crystal cut for phase matching conditions preferably cut for non-critical phase matching (NCPM) conditions for the fundamental beam wavelength and the preselected wavelength beam is located in optical communication with the first and the third reflective surfaces within both the optical parametric oscillator cavity and laser resonator cavity.

The optical axis of the laser resonator and the optical axis of the optical parametric oscillator cavity are at least partially separate and partially overlap. The laser crystal is located in the laser resonator cavity but not in the optical parametric oscillator cavity. The OPO nonlinear crystal is located in the overlapping portion of the cavities along the optical axis of both cavities. Each end of the OPO nonlinear crystal that intersects the optical axes has a Brewster cut for both the fundamental and preselected wavelength beams so that the fundamental and preselected wavelength beams incident on the nonlinear crystal at approximately the Brewster angle and pass through without substantial reflection loss. The resulting nonlinear crystal does not require any antireflection coating.

The fundamental wavelength beam produced by the lasing medium is directed into the optical parametric oscillator cavity and incidents on nonlinear crystal having a Brewster cut at each end for fundamental and preselected wavelength beam without substantial reflection loss. A portion of the fundamental wavelength beam is partially converted to a signal and idler beam having preselected wavelengths. Either the signal or the idler beam is chosen as the preselected wavelength beam having a longer wavelength than the fundamental beam. A variety of OPO crystals cut to produce various wavelengths can be used. The fundamental beam and the preselected wavelength beams are reflected back through the nonlinear crystal. Preselected wavelength length beam is separated from the fundamental wavelength beam. The separated fundamental beam is then directed back through the lasing medium for further amplification. The separated preselected wavelength beam is directed through the nonlinear crystal for amplification. A portion of the preselected wavelength beam desirably is directed outside the oscillator cavity as the output of the laser or for conversion to further preselected wavelength beams.

The resulting laser has a long operational lifetime and improved reliability. The laser can produce a higher power output than conventional OPO lasers. The fundamental peak power threshold requirement of the laser for conversion of fundamental to preselected wavelength beam is lowered. The laser can be operated efficiently in low power as well as high power applications. The damage threshold of the laser is improved to allow the OPO crystal to be pumped at higher power. Desirably according to the invention, high power lasers producing eyesafe wavelengths are provided.

In another aspect of the invention, the preselected wavelength beam is directed through one or more nonlinear crystals for harmonic generation to produce a wide variety of preselected wavelength beam. A 193 nm beam can be produced using a single reliable lasing source such as an Nd:YLF, Nd:YAG, Nd:YVO$_4$ or Nd:GdVO$_4$ lasing crystal.

It is an object of the invention to provide a laser having an OPO crystal that does not require antireflective coating.

It is an object of the invention to provide a laser having an OPO crystal which has an improved damage threshold.

It is an object of the invention to provide a laser having an OPO crystal which has an improved reliability.

It is an object of the invention to provide a laser having an OPO crystal which has an improved longevity.

It is an object of the invention to provide a laser having an OPO crystal which has a low laser threshold for conversion of fundamental beam to a preselected longer wavelength beam.

Other and further objects will be apparent from the appended specification and drawings. It should be specifically understood that each embodiment of the invention will not necessarily achieve every object of the invention.

The preferred embodiment of the present invention is illustrated in the drawings and examples. However, it should be expressly, understood that the present invention should not be limited solely to the illustrative embodiment.

DETAILED DESCRIPTION OF THE INVENTION

According to the invention, a method and an apparatus for producing a laser beam having a preselected wavelength which has a longer wavelength than does the fundamental beam of the lasing medium is provided. The final output of the laser may be the longer wavelength beam or a shorter wavelength beam produced from the longer wavelength beam. The preselected wavelength is selected by choosing a lasing medium lasing at a preselected fundamental wavelength and an OPO nonlinear crystal for producing the desired longer wavelength beam from the fundamental wavelength beam. A variety of wavelengths can be produced depending on the lasing wavelength of the lasing medium, the OPO crystal used and OPO crystal orientation. Desirably, eyesafe wavelength beams can be produced.

A laser resonator cavity is formed between two reflective surfaces, preferably mirrors. A lasing medium for example Nd:YLF, Nd:YAG, Nd:YVO$_4$ or Nd:GdVO$_4$ is selected to produce a desired wavelength for conversion to a longer wavelength. The lasing medium is located within the laser resonator cavity for generating a fundamental wavelength beam. Preferably a Q-switch is provided in the laser resonator cavity. The Q-switch can be selected from a variety of available Q-switches for example an acousto-optic, electro-optic or passive Q-switches.

An optical parametric oscillator cavity is formed between two reflective surfaces. Preferably the optical parametric oscillator cavity and the laser resonator cavity share a reflective surface. Optionally each cavity has its two separate reflective surfaces preferably mirrors.

A nonlinear crystal cut for phase matching condition preferably cut for noncritical phase matching (NCPM) conditions for the fundamental beam wavelength and the preselected wavelength beam is located in optical communication with the first and the third reflective surfaces within both the optical parametric oscillator cavity and laser resonator cavity. Optionally the crystal may be cut for critical phase matching conditions. These crystals can be selected from a wide variety of crystals for example KTP, KTA, RTA, and RTP depending on the lasing wavelength and the desired longer wavelength desirably KTA and KTP OPO crystals.

The optical axis of the laser resonator and the optical parametric oscillator cavity are at least partially separate and partially overlap. The lasing crystal is located in the laser resonator cavity but not in the optical parametric oscillator cavity. The OPO nonlinear crystal is located in the overlapping portion of the cavities along the optical axis of both cavities. Each end of the OPO nonlinear crystal that intersects the optical axes has a Brewster cut for both the fundamental and preselected wavelength beams so that the fundamental and preselected wavelength beams incident on the nonlinear crystal at approximately the Brewster angle without substantial reflection loss by the crystal. The Brewster angle is calculated from the formula:

$\Theta_{brew} = \tan^{-1}(n)$ where $\Theta_{brew}$ is the Brewster angle, n is the index of refraction of the OPO crystal. For example, for KTA crystal, the Brewster angle is about 61 degrees for the preselected wavelength of 1516 nm and 1053 nm fundamental wavelength.

Desirably the fundamental and preselected beam incident on the nonlinear crystal at substantially the Brewster angle that is at an angle that is within about 10 degrees or less of the Brewster angle. More desirably the beams incident on the nonlinear crystal within about 5 degrees of the Brewster angle or less, preferably within 3° of the Brewster angle or less, most preferably at about the Brewster angle. The resulting nonlinear crystal does not require any antireflection coating. Desirably an eyesafe wavelength of 1500 nm to 1600 nm is provided. Optionally one or more harmonic generators can be provided desirably intracavity preferably in the part of the OPO cavity that does not overlap the laser resonator cavity.

The fundamental wavelength beam produced by the lasing medium is directed into the optical parametric oscillator cavity and incidents on nonlinear crystal without substantial reflection where a portion of the fundamental wavelength beam is partially converted to a signal and idler beam having preselected wavelengths. Either the signal or the idler beam is chosen as the preselected output beam having a longer wavelength than the fundamental beam. A variety of OPO crystals cut to produce various wavelengths can be used. The fundamental beam and the output wavelength beams are reflected back through the nonlinear crystal without substantial reflection loss to form additional output wavelength beam. Output wavelength beam is separated from the fundamental wavelength beam. The separated fundamental beam is then directed back through the lasing medium for further amplification. The separated output wavelength beam is directed through the nonlinear crystal for amplification. A portion of the output wavelength beam is directed outside the oscillator cavity as the output of the laser or for conversion to another wavelength.

The resulting laser has a long operational lifetime and improved reliability. The laser can produce a higher power output than conventional OPO lasers. The OPO crystal does not require expensive and damage prone antireflection coatings. The laser also has a lower threshold for conversion of fundamental to preselected wavelength beam than conventional OPO lasers. The laser can be operated efficiently in low power as well as high power applications. The damage threshold of the laser is improved to allow the OPO to produce higher power. Thus, a versatile laser is provided that can be used in both high power and low power applications.

In another aspect of the invention, the preselected wavelength beam is directed through one or more nonlinear crystals for harmonic generation to produce a wide variety of preselected wavelength beam. A particularly useful embodiment is a laser producing a 193 nm beam desired in many fields such as lithography (metrology of 193 nm stepper lenses), calibration of precision DUV spectrometers, mask inspection. A 193 nm beam can be produced using a single reliable lasing source such as an Nd:YLF, Nd:YAG, Nd:YVO$_4$ or Nd:GdVO$_4$ lasing crystal.

According to the invention, a laser resonator cavity is formed between a first reflective surface and a second reflective surface, preferably high reflecting mirrors having a resonator optical axis. A lasing crystal preferably a Nd:YAG, or a Nd:YVO$_4$ crystal, producing a 1064 nm fundamental beam is located within the cavity for generating a fundamental wavelength beam. Optionally a Nd:YLF lasing crystal generating a fundamental of 1053 nm is used. Desirably a Q-switch is provided in the laser resonator cavity.

An optical parametric oscillator (OPO) cavity is formed between the first reflective surface and a third reflective surface. Optionally the optical parametric oscillator cavity does not share a mirror with laser resonator cavity and is formed between a first and second OPO reflective surfaces. The optical parametric oscillator cavity has an oscillator optical axis which is in part separate from the resonator optical axis and which in part overlaps the resonator optical axis. A nonlinear crystal for OPO generation preferably a noncritically phased matched nonlinear crystal is located within the OPO cavity along the oscillator optical axis and along the resonator optical axis in optical communication with the first and third reflective surfaces. The nonlinear crystal is oriented to convert the fundamental wavelength beam of the lasing crystal into an output wavelength beam of about 1544 nm. The OPO crystal is desirably KTP, KTA, RTA, and RTP. The fundamental wavelength beam is directed into the optical parametric oscillator cavity along the oscillator optical axis and through the nonlinear crystal to convert a portion of the fundamental wavelength beam to a 1544 nm output wavelength beam. The ends of the nonlinear crystal have a Brewster cut at the intersection of the nonlinear crystal and the laser resonator and OPO cavity axes so that the fundamental beam and the 1544 nm output wavelength beam incident on the crystal within 10 degrees of the Brewster angle preferably at about the Brewster angle for the crystal.

The first reflective surface is reflective preferably highly reflective of 1064 nm beam and at least partially reflective of 1544 nm beam. The fundamental and output beams from the first reflective surface are reflected back through the nonlinear crystal where additional 1544 nm wavelength beam is formed in the OPO cavity.

Within the overlapping portion of the cavities, a beam separator preferably a dichroic mirror is provided to separate 1544 nm beam from 1064 nm beam. The fundamental beam is directed preferably reflected back through the lasing medium for further amplification. The separated 1544 nm beam is directed to the third reflective surface where the beam is at least partially reflected back through the nonlinear crystal. An output coupler is provided to remove a portion of the 1544 nm beam from the OPO cavity and direct it on an output path outside the optical parametric oscillator cavity. Desirably about 3% to 40% of the 1544 nm wavelength beam is transmitted by the output coupler. Desirably the output coupler functions as either the third or first reflective surface as well and reflects 60% to 97% of the 1544 nm beam. A second harmonic generator is located along the 1544 nm output path for converting a portion of the 1544 nm beam to 772 nm beam. Propagating from the second harmonic generator is 1544 nm beam and 772 nm beam on a first second harmonic output path. A second, second harmonic generator is located along the first second harmonic output path for converting a portion of the 772 nm beam from the first second harmonic generator to 386 nm beam. The second, second harmonic generator delivering 772 nm beam and 386 nm beam on a second, second harmonic output path. A third harmonic generator (1 w+2 w=3 w) is located along the second, second harmonic output path for converting a portion of the 772 nm beam and a portion of the 386 nm beam to 257 nm beam. The third harmonic generator delivering 772 nm beam and 257 nm beam on a third harmonic generator output path. A fourth harmonic generator (1 w+3 w=4 w) is provided in optical communication with the third harmonic generator output path for converting a portion of the 772 nm beam and the 257 nm beam to a 193 nm beam. The fourth harmonic generator delivering the 193 nm on a fourth harmonic generator output path. Preferably the output of the fourth harmonic generator is directed to a beam separator for example a prism or a dichroic mirror where the 193 nm beam is separated from other beams propagating from the fourth harmonic generator. As a result a laser using the reliable Nd:YAG or Nd:YLF or Nd:YVO$_4$ and producing the desired 193 nm wavelength beam is provided which requires the use of only one lasing medium.

Figure 1:
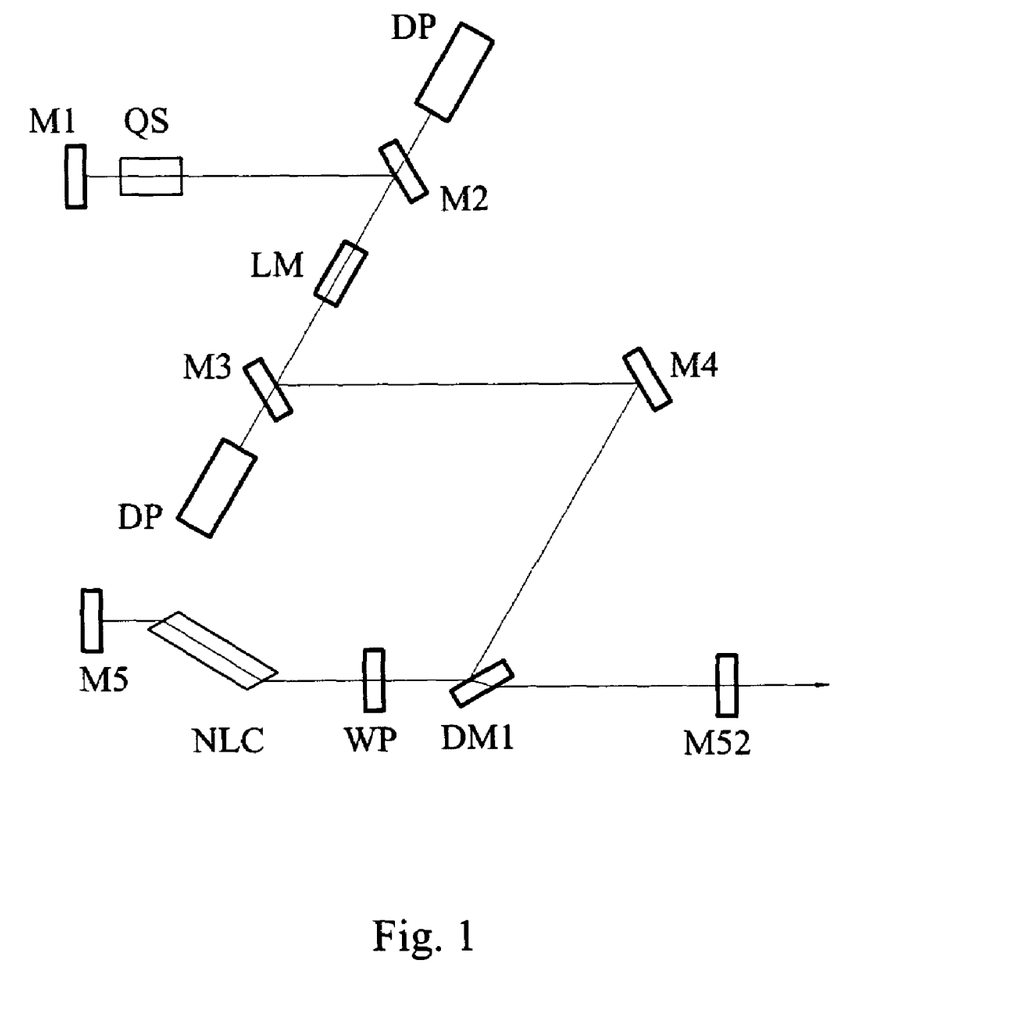
FIG. 1 is a schematic view of a laser according to the invention.

Referring to FIG. 1, according to the invention, an apparatus for producing a preselected frequency laser output is provided. A laser resonator cavity and an optical parametric oscillator cavity are provided which are partially separate and partially overlap. The laser resonator cavity is formed between two reflective surfaces, preferably mirror M1 and mirror M5 which are both highly reflective for fundamental beam propagating from lasing medium LM. Lasing medium LM is provided within the laser resonator cavity. Folding mirror M2 which is highly reflective for fundamental beam is provided in optical communication with mirror M1 and lasing medium LM. Folding mirror M3 is also provided in optical communication with lasing medium desirably Nd:YLF crystal LM. Other appropriate lasing medium can be selected depending on output wavelength. Folding mirror M4 is provided in optical communication with folding mirror M3. Both folding mirrors M3 and M4 are highly reflective for fundamental beam. A beam separator desirably dichroic mirror DM1 is provided in optical communication with folding mirror M4. Dichroic mirror DM1 is highly reflective for fundamental beam preferably at S-polarization is located in optical communication with laser resonator cavity end mirror DM2. A Q-switch QS is provided in the laser resonator cavity preferably between mirrors M1 and M2. The Q-switch can be chosen from a variety of suitable Q-switches for example acousto-optic, electro-optic, and passive Q-switches, desirably a $Cr^{+4}$:YAG crystal passive Q-switch.

An optical parametric oscillator cavity is provided between mirrors M5 and mirror M52. Mirror DM1 is located between mirrors M5 and M52. Between mirrors DM1 and M5, an OPO crystal preferably cut for non-critical phase matching (NCPM) preferably a KTA noncritically phased matched, nonlinear crystal NLC is provided. The laser cavity optical axis extends from M1 to M5. The OPO cavity axis extends between M5 and M52. The OPO crystal is located along the overlapping portion of the axis. The OPO optical axis and laser cavity optical axis partially overlap and are partially separate. Each end of the OPO nonlinear crystal NCL that intersects the optical axes is cut at about the Brewster angle for fundamental beam and the preselected frequency beam desired as the output of the laser. Desirably the fundamental and preselected beam incident on the nonlinear crystal at substantially the Brewster angle that is at an angle that is within about 10 degrees or less of the Brewster angle. More desirably the beams incident on the nonlinear crystal within about 5 degrees of the Brewster angle or less preferably within 3° of the Brewster angle or less most preferably at about the Brewster angle. In this example the Brewster angle is about 61°. The beams incident on the OPO crystal at about 51° to 71°. Waveplate WP is desirably provided between dichroic mirror DM1 and the OPO nonlinear crystal NLC. The waveplate WP rotates the fundamental beam one-half wave and rotates the preselected output beam full wave or full wave multiples.

The optical parametric oscillator cavity is provided between mirrors M5 and mirror M52. Mirror M5 is highly reflective for the preselected wavelength beam and highly reflective for fundamental beam wavelength beam. Mirror M52 is partially reflective and partially transmissive for the preselected frequency beam. The OPO crystal can be cut for a variety of wavelengths, desirably cut to provide a signal beam of 1.5 μm to 1.6 μm within the eye safe range. The resulting idler beam produced is 3.4 μm for an Nd:YLF lasing medium lasing at 1.053 μm. Diode pumps DP are provided in optical communication with mirrors M2 and M3 which are highly transmissive for pump wavelength to pump the lasing medium LM.

In operation, the lasing medium is pumped by pump beams from diode pumps DP and beam oscillation occurs in the laser resonator cavity between mirrors M1 and M5. Fundamental beam from Nd:YLF lasing medium LM is reflected by mirror M3 to mirror M4 to dichroic mirror DM1. Preferably, the dichroic mirror DM1 is highly reflective for S-polarized fundamental beam. The fundamental beam from lasing medium in this embodiment is vertically polarized and it incidents on DM1 at S-polarization. An S-polarization is preferred for the beam incidenting on DM1 since more highly reflective coatings are available to reflect S-polarization and thus, a greater percentage of the fundamental beam is reflected (99.9%). The Brewster cut OPO crystal allows for the passing of the fundamental beam through the OPO crystal with little or no loss at P-polarization. Desirably the fundamental and preselected beam incident on the nonlinear crystal at substantially the Brewster angle that is at an angle that is within 10 degrees of the Brewster angle. More desirably the beams incident on the nonlinear crystal within 3 degrees of the Brewster angle preferably at about the Brewster angle.

The fundamental beam reflected by DM1 needs to be rotated one-half wave so that it has P-polarization when it incidents on the OPO crystal having the Brewster cut at either end. The waveplate WP rotates the polarization of the fundamental beam ½ wave to P-polarization. Preferably, the OPO crystal is a KTA crystal cut for non-critical phase matching for the desired output beam and fundamental beam. Here the crystal is cut to produce an output or a signal beam having an eyesafe wavelength of 1.516 um and an idler beam of 3.4 um upon the incidenting of a pump beam of 1.05 μm produced by an Nd:YLF laser crystal. The fundamental beam passes through the OPO crystal and a portion is converted to P-polarized signal and S-polarized idler beam. Mirror M5 which is highly reflective for both fundamental and preselected wavelength beams reflects both fundamental and preselected wavelength beam back through the nonlinear crystal NLC where a further portion of the fundamental wavelength beam is converted to idler and signal beam. The waveplate WP rotates the fundamental beam one-half wave so that when it strikes mirror DM1 which is highly reflective for S-polarized fundamental beam, the beam is S-Polarized and reflected back to mirror M4 then to mirror M3 back through the lasing material for further amplification. The preselected frequency beam is rotated a full wave or a full wave multiple so that its P-polarization is maintained. The preselected frequency beam in this embodiment, the signal beam having an eye safe wavelength is transmitted by dichroic mirror DM1 and directed to parametric oscillator end mirror M52 which is partially transmissive and partially reflective for preselected frequency beam. A portion preferably about 3% to 40% of the preselected wavelength beam is transmitted by mirror M52 as the laser output. A portion of the preselected wavelength beam is reflected by M52 back through mirror DM1 through waveplate WP which rotates the preselected frequency beam a full wave or a multiple of a full wave and back through OPO crystal for amplification. The fundamental and the preselected frequency beam need to have the same polarization when passing through the OPO crystal. The fundamental beam produces P-polarization preselected beam. The Brewster cut nonlinear crystal transmit P-polarized preselected frequency beam with minimal losses. As a result, the waveplate WP should not change the polarization of the preselected frequency beam when such beam passes there through.

The resulting output of FIG. 1 is an eye safe beam having a wavelength of approximately 1.516 nm. The noncritically phase matched OPO crystal, preferably a KTA crystal having the Brewster cuts at either end need not have antireflection coating. The resulting laser has an improved reliability and longevity and can produce an increased power output without damage to the OPO crystal. In addition, the laser can also be run at lower power since the laser threshold for conversion of fundamental to signal and/or idler beam is improved.

Figure 2A:
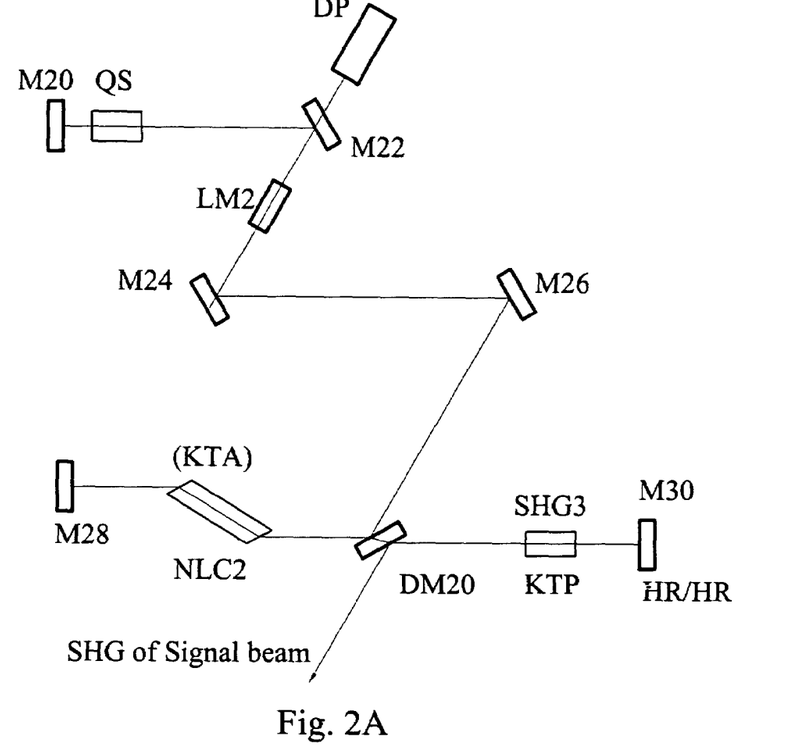
FIG. 2A is a schematic view of an alternate embodiment of a laser according to the invention.
Figure 2B:
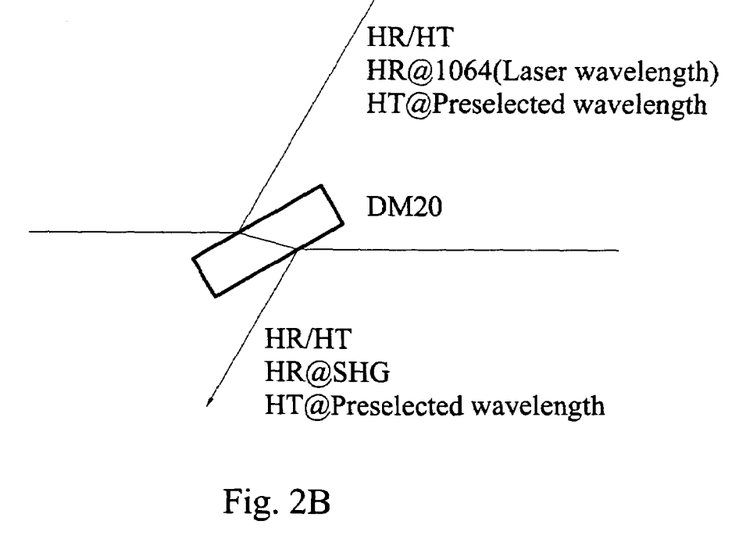
FIG. 2B is a schematic view of dichroic mirror DM20 of FIG. 2A

Referring to FIGS. 2A and 2B, an alternative embodiment of the invention is shown. A laser resonator cavity and an optical parametric oscillator cavity are provided which are partially separate and partially overlap. The laser resonator cavity is formed between two reflective surfaces, preferably mirror M20 and mirror M28 which are both highly reflective for fundamental beam propagating from lasing medium LM. Lasing medium LM is provided within the laser resonator cavity. Desirably Nd:YAG or optionally Nd:YVO$_4$ crystal LM lasing at 1064 nm are used. Other appropriate lasing medium can be selected depending on desired output wavelength and pulse energy. Folding mirror M22 which is highly reflective for fundamental beam is provided in optical communication with mirror M20 and lasing medium LM. Folding mirror M24 is also provided in optical communication with lasing medium LM. Folding mirror M26 is provided in optical communication with folding mirror M24. Both folding mirrors M26 and M24 are highly reflective for fundamental beam. A beam separator, desirably dichroic mirror DM20 is provided in optical communication with folding mirror M26. Dichroic mirror DM20 is highly reflective for fundamental beam propagating from mirror M26, highly transmissive in both directions for preselective wavelength beam and highly reflective for second harmonic beam propagating from SHG3. Dichroic mirror DM20 is located in optical communication with laser resonator cavity end mirror M28.

A Q-switch QS is preferably provided in the laser resonator cavity preferably between mirrors M20 and M22, alternatively Q-switch can be located any where within the resonator cavity, preferably on within the OPO cavity. The Q-switch can be chosen from a variety of suitable Q-switches for example acoustooptic, elecrtrooptic, and passive Q-switches, desirably a Cr$^{+4}$:YAG crystal passive Q-switch.

An optical parametric oscillator cavity is provided between mirrors M28 and M30. Mirror DM20 is located between mirrors M28 and M30. Between mirrors DM20 and M28, an OPO crystal preferably cut for non-critical phase matching (NCPM) preferably a KTA noncritically phased matched, nonlinear crystal NLC2 is provided. The laser cavity optical axis extends from M20 to M28. The OPO cavity axis extends between M28 and M30. The OPO crystal is located along the overlapping portion of the axes. The OPO optical axis and laser cavity optical axis partially overlaps and are partially separate. Each end of the OPO nonlinear crystal NCL2 that intersects the optical axes is cut at about the Brewster angle for fundamental beam and the preselected frequency beam desired as the output of the laser. Here the Brewster angle is approximately 61°. A second harmonic nonlinear generator preferably a second harmonic nonlinear crystal desirably a type I KTP second harmonic nonlinear crystal SHG3 is provided between dichroic mirror DM20 and mirror M30 in the OPO optical cavity.

The second harmonic crystal SHG3 is preferably located in the portion of the OPO cavity that does not overlap the laser resonator cavity. A shown in FIG. 2B, dichoric mirror DM20 is highly reflective for fundamental beam (1064 nm) and highly transmissive for preselected wavelength beam on the side in optical communication with mirrors M28 and M26. On the side in optical communication with mirror M30, DM20 is highly reflective for second harmonic beam and highly transmissive for preselected wavelength beam. Optionally, beam separator DM20 can be replaced by other beam separation systems for example two or more separate dichroic mirrors or an output coupler for second harmonic output and a dichoric mirror or a prism.

The optical parametric oscillator cavity is provided between mirrors M28 and M30. Mirror M28 is highly reflective for the preselected wavelength beam and highly reflective for fundamental wavelength beam. Mirror M30 is highly reflective for both the preselected frequency beam and second harmonic beam. The OPO crystal in this embodiment is desirably cut to provide a signal beam of about 1536 nm and an idler beam of about 3465 nm for a Nd:YAG lasing medium lasing at about 1064.2 nm. Diode pump DP is provided in optical communication with mirror M22 which is highly transmissive for pump wavelength to pump the lasing medium LM. The 1536 nm beam is the preselected beam.

In operation, the lasing medium is pumped by pump beams from diode pump DP and beam oscillation occurs in the laser resonator cavity between mirrors M20 and M28. Fundamental beam from Nd:YAG lasing medium LM is reflected by mirror M24 to mirror M26 to dichroic mirror DM20. Dichroic mirror DM20 is highly reflective for P-polarized fundamental beam. The fundamental beam (1064 nm) from lasing medium in this embodiment is horizontally polarized and incidents on DM20 at P-polarization. The Brewster cut OPO crystal allows for the passing of the fundamental beam through the OPO crystal with little or no loss at both surfaces at P-polarization. Preferably, the OPO crystal is a KTA crystal cut for non-critical phase matching for the desired preselected wavelength beam and fundamental beam. Here the crystal is cut to produce a signal beam (preselected beam) having an eye safe wavelength of about 1.536 um and an idler beam of 3.465 um upon the incidenting of a pump beam of 1.064 µm produced by an Nd:YAG laser crystal. The fundamental beam passes through the OPO crystal and a portion is converted to signal and idler beams. Mirror M28 which is highly reflective for both fundamental and preselected wavelength beams reflects both fundamental and preselected wavelength beams back through the nonlinear crystal NLC2 where a further portion of the fundamental wavelength beam is converted to idler and signal beams. The fundamental beam propagating from NLC2 is reflected by mirror DM20 to mirrors M26 to M24 then through the lasing medium LM for further amplification. The preselected wavelength beam is transmitted by dichroic mirror DM20 and directed through second harmonic generator SHG3 where a portion of the preselected wavelength beam is converted to second harmonic beam here 768 nm. The second harmonic and preselected wavelength beam are directed to parametric oscillator end mirror M30 which is highly reflective for preselected wavelength beam and second harmonic beam. The preselected wavelength beam and the second harmonic beam are directed back through second harmonic generator SHG3 where a further portion of preselected wavelength beam is converted to second harmonic beam. Preselected wavelength beam and second harmonic beam propagating from second harmonic generator SHG are directed to a beam separator desirably dichroic mirror DM20. The second harmonic beam is desirably reflected outside the oscillator as the output. The preselected wavelength beam is transmitted by DM20 and retained in the OPO cavity for further amplification.

Figure 3:
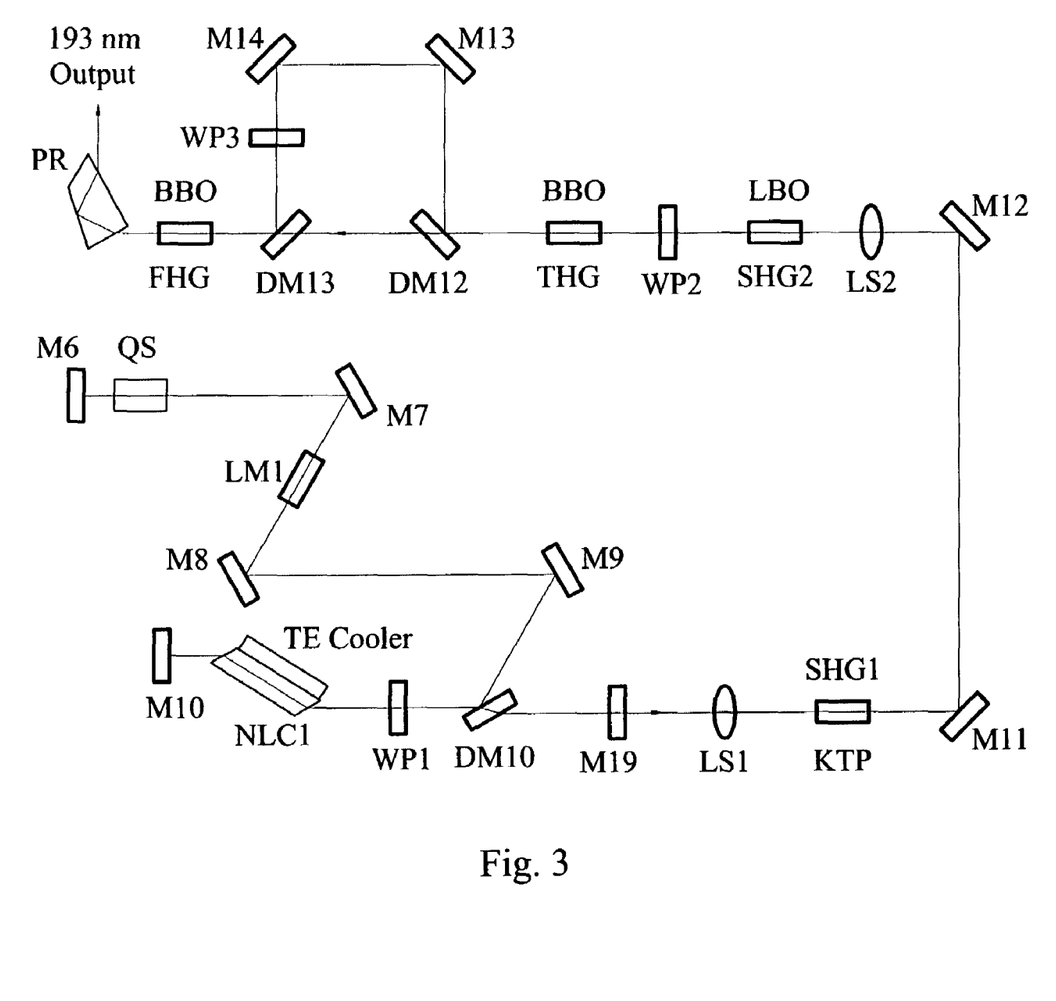
FIG. 3 is a schematic view of an alternate embodiment of a laser according to the invention.

Referring to FIG. 3, a further embodiment of the invention is shown using a reliable YAG lasing medium to provide a 193 nm output. In FIG. 3, a laser resonator cavity and an optical parametric oscillator cavity are provided which are partially separate and partially overlap. The laser resonator cavity is formed between two reflective surfaces, preferably mirror M6 and mirror M10 which are both highly reflective for fundamental beam propagating from lasing medium LM1 preferably an Nd:YAG crystal lasing at a fundamental frequency of 1064 nm or optionally an Nd:YVO$_4$ crystal lasing at about 1064 can be used. Lasing medium LM1 is provided within the laser resonator cavity. Folding mirror M7 which is highly reflective for fundamental beam is provided in optical communication with mirror M6 and lasing medium LM1. Folding mirror M8 is also provided in optical communication with lasing medium LM1. Folding mirror M9 is provided in optical communication with folding mirror M8. Folding mirrors M7, M8 and M9 are highly reflective for fundamental beam. A beam separator desirably dichroic mirror DM10 is provided in optical communication with folding mirror M9 and is located within both optical cavities. Dichroic mirror DM10 is highly reflective for fundamental beam preferably at S-polarization and highly transmissive for the preselected wavelength beam. Preferably Q-switch QS is provided in the laser resonator cavity preferably between mirrors M6 and M7. The Q-switch can be chosen from a variety of suitable Q-switches for example acoustooptic, elecrtrooptic, and passive Q-switches, desirably a $Cr^{+4}$:YAG crystal passive Q-switch.

An optical parametric oscillator cavity is provided between mirrors M10 and mirror M19. Dichroic mirror DM10 is located between mirror M10 and mirror M19 and is in optical communication with both mirrors. DM10 is preferably oriented at about the Brewster angle for preselected frequency beam reflected by M10. Between mirrors DM10 and M10, an OPO crystal preferably cut for non-critical phase matching (NCPM) preferably a KTA noncritically phased matched, nonlinear crystal NLC1 is provided. The crystal is cut to produce a signal beam of 1544 nm and an idler beam of 3424 nm. The 1544 nm beam is the preselected beam. Desirably NCL1 is a KTA crystal. For example a KTA-2 crystal chilled to about −6° C. will produce a 1544 nm beam. When pumped by a 1064.2 nm beam. Desirably the temperature of NCL1 is controlled by a thermoelectric cooler TE on which the nonlinear crystal NCL1 is mounted. The laser cavity optical axis extends from M6 to M10. The OPO cavity axis extends between M10 and M19. The OPO nonlinear crystal NCL1 is located along the overlapping portion of the axis. The OPO optical axis and laser cavity optical axis partially overlaps and are partially separate. Each end of the OPO nonlinear crystal NCL1 that intersects the optical axes is cut at the Brewster angle for fundamental beam and the preselected wavelength beam desired. Waveplate WP1 is desirably provided between dichroic mirror DM10 and the OPO nonlinear crystal NCL1. The waveplate WP1 rotates the fundamental beam one-half wave and rotates the preselected output beam full wave or full wave multiples.

Mirror M10 is highly reflective for the preselected wavelength beam and highly reflective for fundamental beam wavelength beam. Mirror M19 is partially reflective and partially transmissive for the preselected frequency beam, 1544 nm here. Preferably M19 is 3% to 40% transmissive at preselected wavelength beam. Diode pumps not shown are provided in optical communication with mirrors M7 and M8 which are highly transmissive for pump wavelength to pump the lasing medium LM.

A second harmonic generator SHG1 preferably a type I KTP nonlinear crystal is provided in optical communication with the 1544 nm beam transmitted by mirror M19 to produce a 772 nm beam. Desirably a lens focusing system LS1 is provided intermediate M19 and SHG1. A folding mirror M11, highly reflective for 772 nm beam, is provided in optical communication with second harmonic generator SHG1. Folding mirror M12, highly reflective for 772 nm beam, is provided in optical communication with mirror M11. A second harmonic generator SHG2 preferably a type I LBO or type I BBO nonlinear crystal is provided in optical communication with mirror M12 for conversion of a portion of the 772 nm beam to 386 nm beam. Desirably a lens focusing system LS2 is provided intermediate mirror M12 and SHG2 in optical communication with both. A third harmonic generator (1 w+2 w=3 w) THG is provided in optical communication with SHG2 to convert a portion of the 386 nm and 772 nm beams to 257 nm beam. A waveplate WP2 is provided intermediate THG and SHG2 to rotate the polarization of the 772 nm or the 386 nm beam preferably the 386 nm beam ½ wave so that the beams have parallel polarization when they incident on third harmonic generator THG (where type I phase match third harmonic nonlinear crystal is used). A dichroic mirror DM12 is provided in optical communication with third harmonic generator THG. DM12 is highly transmissive for 257 nm beam and highly reflective for 772 nm beam. Folding mirror M13 which is highly reflective for 772 nm beam is provided in optical communication with dichroic mirror DM12. Folding mirror M14 is provided in optical communication with M13. A dichroic mirror DM13 is provided in optical communication with M14 and DM12. Intermediate DM13 and M14 a waveplate WP3 is provide to rotate the polarization of the 772 nm beam ½ wave prior to its incidenting on DM13. DM 13 is highly transmissive for 257 nm beam and highly reflective for 772 nm beam. A fourth harmonic generator FHG (1 w+3 w=4 w) preferably a BBO fourth harmonic generator is provided in optical communication with DM13. The 257 nm beam and the 772 nm beam pass through FHG simultaneously where a portions of the beams are converted to 193 nm beam. A beam separator desirably a dichoric mirror preferably a prism PR is provided to deliver the 193 nm beam as the output of the laser.

In operation, 1544 nm beam propagating from mirror M19 is desirably focused in lens focusing system LS1 and directed to a second harmonic generator SHG1 preferably a KTP nonlinear crystal which converts a substantial portion of the 1544 nm wavelength beam to 772 nm wavelength. The 772 nm beam is directed to a mirror M11 which is highly reflective for 772 nm wavelength beam and reflects the 772 nm beam to mirror M12 which is also highly reflective for 772 nm wavelength. M12 reflects the beam through lens focusing system LS2 and through a second harmonic generator SHG2 preferably an LBO second harmonic generator where a portion of the 772 nm wavelength beam is converted to its second harmonic wavelength namely, 386 nm. The 772 nm beam and the 386 nm beam are then directed through a waveplate WP2 where the 386 nm beam is rotated ½ wave and the 772 nm a full wave or multiples of full wave so that both beams will have parallel polarization. The 772 nm beam and 386 nm beam are then directed through a third harmonic generator preferably a BBO third harmonic generator preferably type I BBO third harmonic nonlinear crystal (1 w+2 w=3 w). The beams propagating from the third harmonic generator then are 772 nm, 386 nm and 257 nm. The 257 nm beam is transmitted by dichroic mirror DM12. The 772 nm beam is reflected to folding mirror M13 which is highly reflective for 772 beam. M13 reflects the 772 nm beam to M14 which reflects the 772 beam to waveplate WP3 which rotates the 772 nm beam ½ wave and directs the 772 nm to dichroic mirror DM13. DM13 is highly reflective for 772 nm beam and is highly transmissive for 257 nm beam. The 772 nm and the 257 nm beams which have parallel polarization are then directed through fourth harmonic nonlinear crystal (1 w+3 w=4 w) FHG preferably a type I BBO nonlinear crystal where a portion of the 772 nm beam and the 257 nm beam are converted to fourth harmonic beam having a wavelength of 193 nm. The beams propagating from FHG are then directed to a beam separator for example, a dichroic mirror or a prism PR where the fourth harmonic beam is separated and directed outside the device.

Figure 4:
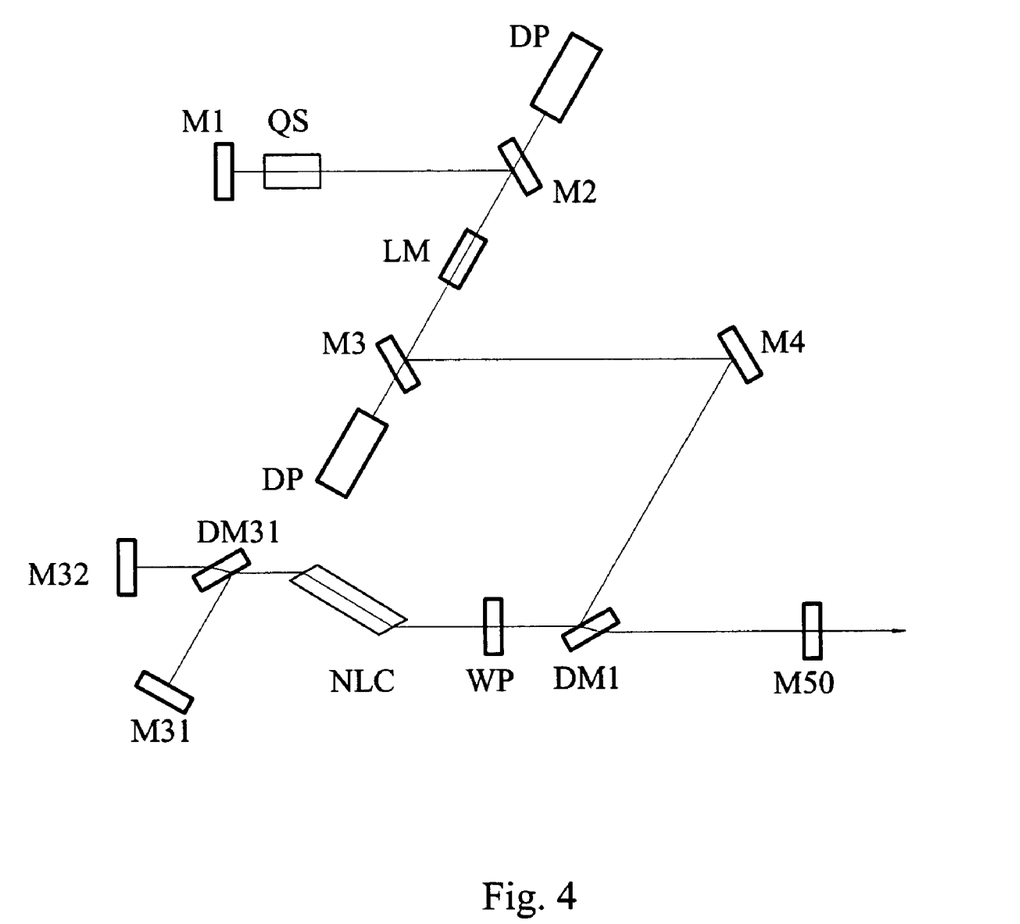
FIG. 4 is an expanded schematic view of an alternate embodiment of a laser according to the invention.

Referring to FIG. 4 an alternative embodiment is provided. The laser in FIG. 4 is similar to the one in FIG. 1 except the OPO and laser resonator cavity do not share a cavity mirror. Mirror M32 is one of the laser resonator end mirrors. Mirror M32 is highly reflective for fundamental wavelength beam. The laser resonator extends between mirrors M32 and M1. Mirror M31 is one of the OPO cavity end mirrors. The OPO cavity extends between mirrors M31 and M50. Dichroic mirror DM31 is provided in optical communication with nonlinear crystal NLC, mirrors M31 and M32. DM31 is highly reflective for preselected wavelength beam and is oriented at about Brewster angle for fundamental beam incidenting on DM31 so that fundamental beam is transmitted without substantial loss from reflection. M32 which is highly reflective for preselected wavelength beam is provided in optical communication with dichroic mirror DM31.

In operation, fundamental beam propagating from nonlinear crystal NLC is transmitted by DM31 and directed to mirror M32 where it is reflected back through DM31 to nonlinear crystal NLC where a further portion of fundamental beam is converted to preselected wavelength beam. Preselected wavelength beam is reflected by dichroic mirror DM31, to M31 where it is reflected back to DM31 which reflects preselected beam back through the nonlinear crystal. The laser otherwise functions as described in connection with FIG. 1.

The foregoing is considered as illustrative only to the principles of the invention. Further, since numerous changes and modification will occur to those skilled in the art, it is not desired to limit the invention to the exact construction and operation shown and described above, and accordingly all suitable modifications and equivalents may be resorted to, falling within the scope of the invention.

The invention claimed is:

1. A laser providing a preselected wavelength beam comprising:
   a) a laser resonator having a laser resonator cavity formed between a first laser resonator reflective surface and a second laser resonator reflective surface, said laser resonator having a resonator optical axis;
   b) a lasing medium located within said laser resonator cavity for generating a fundamental wavelength beam;
   c) an optical parametric oscillator (OPO) cavity formed between a first OPO reflective surface and a second OPO reflective surface said optical parametric oscillator cavity having an oscillator optical axis which is in part separate from said resonator optical axis and which in part overlaps said resonator optical axis;

d) an OPO nonlinear generator for OPO generation located within said OPO cavity along said oscillator optical axis and along said resonator optical axis in optical communication with said first and said second OPO reflective surface;

said OPO nonlinear generator oriented to convert said fundamental wavelength beam into a preselected wavelength beam having a preselected longer wavelength than said fundamental beam;

e) means to direct said fundamental wavelength beam into said optical parametric oscillator cavity along said oscillator optical axis and through said OPO nonlinear generator at a preselected polarization to convert a first portion of said fundamental wavelength beam to a preselected wavelength beam having a longer wavelength than said fundamental beam, said preselected wavelength beam having the same preselected polarization as said fundamental beam;

f) said optical axes intersecting opposed faces of said OPO nonlinear generator;

said opposed faces having a Brewster cut at the intersection of said OPO nonlinear generator and said axes so that the fundamental beam and the preselected wavelength beam incident on said generator within 10 degrees of the Brewster angle for said generator; both said preselected wavelength beam and said fundamental beam incidenting on said on said generator at said preselected polarization;

g) said fundamental beam reflected by said first resonator reflective surface back through said OPO nonlinear generator at said preselcted polarization to convert a second portion of said fundamental laser beam to preselected wavelength beam having the same preselected polarization as said fundamental beam; said preselected wavelength beam reflected by said OPO first reflective surface to oscillate said preselected wavelength beam in said OPO cavity;

i) a first beam separator in optical communication with said OPO nonlinear generator to separate said preselected wavelength beam from said fundamental wavelength beam after said second portion of said fundamental beam has been converted to preselected wavelength beam;

j) fundamental beam directing means to direct said separated fundamental beam back through said lasing medium for further amplification;

k) preselected wavelength beam directing means for directing said separated preselected wavelength beam to said second OPO reflective surface where said beam is at least partially reflected back through said OPO nonlinear generator at said preselected polarization.

2. The laser for providing a preselected wavelength according to claim 1 further comprising a Q-switch.

3. The laser for providing a preselected wavelength according to claim 2 wherein said Q-switch is an acousto-optic Q-switch.

4. The laser for providing a preselected wavelength according to claim 2 wherein said Q-switch is an electro-optic Q-switch.

5. The laser for providing a preselected wavelength according to claim 2 wherein said Q-switch is a passive Q-switch.

6. The laser for providing a preselected wavelength according to claim 5 wherein said passive Q-switch is a $Cr^{+4}$:YAG crystal.

7. The laser for providing a preselected wavelength beam according to claim 2 wherein said OPO nonlinear generator is an OPO nonlinear OPO crystal cut for noncritical phase matching.

8. The laser for providing a preselected wavelength beam according to claim 2 further comprising l) an output coupler to remove a portion of said preselected wavelength beam outside said optical parametric oscillator cavity.

9. The laser for providing a preselected wavelength beam according to claim 2 wherein said first OPO reflective surface and said first laser resonator reflective surface formed by a single mirror, said mirror highly reflective for fundamental beam and at least partially reflective for preselected wavelength beam.

10. The laser for providing a preselected wavelength beam according to claim 7 wherein said first OPO reflective surface and said first laser resonator reflective surface formed by a single mirror, said mirror highly reflective for fundamental beam and at least partially reflective for preselected wavelength beam.

11. The laser for providing a preselected wavelength according to claim 7 wherein said OPO nonlinear crystal is a KTP, KTA, RTA, or RTP crystal.

12. The laser for providing a preselected wavelength beam according to claim 11 wherein said lasing medium is a Nd:YAG, Nd:YLF, Nd:GdVO$_4$ or Nd:YVO$_4$ crystal.

13. The laser according to claim 2 wherein said wavelength of preselected wavelength beam is an eyesafe wavelength.

14. The laser according to claim 7 wherein said wavelength of preselected wavelength beam is an eyesafe wavelength.

15. The laser according to claim 10 wherein said wavelength of preselected wavelength beam is an eyesafe wavelength.

16. The laser according to claim 13 wherein said lasing medium is Nd:YAG, or Nd:YVO$_4$ and said OPO nonlinear generator is a KTP or KTA crystal.

17. The laser according to claim 13 wherein said lasing medium is Nd:YLF and said OPO nonlinear generator is KTP or KTA crystal.

18. The laser for providing a preselected wavelength beam according to claim 2 wherein said OPO nonlinear generator is an OPO nonlinear OPO crystal cut for critical phase matching.

19. The laser for providing a preselected wavelength beam according to claim 2 wherein said lasing medium is a Nd:YAG, Nd:YLF, Nd:GdVO$_4$ or Nd:YVO$_4$ crystal.

20. The laser for providing a preselected wavelength beam according to claim 11 wherein said OPO nonlinear generator is a KTA or KTP or RTA crystal.

21. The laser for providing a preselected wavelength beam according to claim 2 wherein said OPO nonlinear crystal is a KTP, KTA, RTA, or RTP crystal.

22. The laser for providing a preselected wavelength beam according to claim 2 wherein said fundament and preselected wavelength beams incident on said generator within 5 degrees of the Brewster angle for said generator.

23. The laser for providing a preselected wavelength beam according to claim 2 wherein said fundament and preselected wavelength beams incident on said generator within 3 degrees of the Brewster angle for said generator.

24. The laser for providing a preselected wavelength beam according to claim 2 wherein said fundamental and preselected wavelength beams incident on said generator at about the Brewster angle for said generator.

25. The laser for providing a preselected wavelength beam according to claim 7 wherein said fundamental and preselected wavelength beams incident on said generator within 5 degrees of the Brewster angle for said generator.

26. The laser for providing a preselected wavelength beam according to claim 7 wherein said fundament and preselected wavelength beams incident on said generator within 3 degrees of the Brewster angle for said generator.

27. The laser for providing a preselected wavelength beam according to claim 7 wherein said fundament and preselected wavelength beams incident on said generator at about the Brewster angle for said generator.

28. The laser according to claim 8 further comprising one or more harmonic generators in optical communication with said output coupler.

29. The laser according to claim 8 further comprising a second harmonic nonlinear crystal in optical communication with said output coupler.

30. The laser according to claim 29 further comprising a third harmonic nonlinear crystal in optical communication with said second harmonic crystal.

31. The laser according to claim 30 further comprising a fourth harmonic nonlinear crystal in optical communication with said third harmonic crystal.

32. The laser according to claim 28 wherein said harmonic generators are nonlinear crystals.

33. The laser according to claim 2 further comprising a second harmonic generator located within said OPO cavity for generation of a second harmonic beam from said preselected wavelength beam.

34. The laser according to claim 7 further comprising a second harmonic generator located within said OPO cavity for generation of a second harmonic beam from said preselected wavelength beam.

35. The laser according to claim 34 wherein said second harmonic generator is a second harmonic nonlinear crystal.

36. The laser according to claim 35 wherein second harmonic generator is located between said first OPO reflective surface and said first beam separator.

37. The laser for providing a preselected wavelength according to claim 36 further comprising l) an output coupler to remove at least portion of second harmonic beam from said optical parametric oscillator cavity.

38. A laser providing a preselected wavelength comprising:
   a) a laser resonator having a laser resonator cavity formed between a first laser resonator reflective surface and a second laser resonator reflective surface, said laser resonator having a resonator optical axis;
   b) a Nd:YAG, Nd:YLF, Nd:GdVO$_4$ or Nd:YVO$_4$ lasing crystal located within said laser resonator cavity for generating a fundamental wavelength beam;
   c) an optical parametric oscillator (OPO) cavity formed between a first OPO reflective surface and a second OPO reflective surface said optical parametric oscillator cavity having an oscillator optical axis which is in part separate from said resonator optical axis and which in part overlaps said resonator optical axis;
   d) a noncritically phased matched OPO nonlinear crystal for OPO generation located within said OPO cavity along said oscillator optical axis and along said resonator optical axis in optical communication with said first and said second OPO reflective surfaces;
   e) said noncritically phased matched OPO nonlinear crystal oriented to convert said fundamental wavelength beam into a preselected output wavelength beam having a preselected longer wavelength than said fundamental beam;
   f) said optical axes intersecting opposed faces of said OPO nonlinear crystal; said opposed faces having a Brewster cut at the intersection of said OPO nonlinear crystal and said axes so that the fundamental beam and the preselected output wavelength beam incident on said crystal within 10 degrees from the Brewster angle for said crystal;
   g) said fundamental beam and said preselected output wavelength beam both incident on said crystal at P-polarization;
   h) said first resonator reflective surface reflective of fundamental wavelength beam and said first OPO reflective surface at least partially reflective of output wavelength beam so that fundamental and output beams reflected by said reflective surfaces propagate back through said OPO nonlinear crystal;
   i) a dichroic mirror located along the overlapping portion of said oscillator optical axis and said resonator optical axis between said OPO nonlinear crystal and said lasing medium; said dichroic mirror either highly reflective or highly transmissive for fundamental wavelength beam to direct said fundamental wavelength beam propagating from said lasing medium into said optical parametric oscillator cavity along said oscillator optical axis and through said OPO nonlinear crystal at P-polarization to convert a portion of said fundamental wavelength beam to a P-polarized preselected wavelength beam having a longer wavelength than said fundamental beam; said dichroic mirror directing fundamental beam reflected by said first resonator reflective surface back through said lasing medium for amplification and directing preselected output wavelength beam reflected by said first OPO reflective surface for at least partial reflection by said second OPO reflective surface.

39. The laser according to claim 38 further comprising:
   k) an output coupler in optical communication with said preselected wavelength beam to direct a portion of said preselected wavelength beam outside said optical parametric oscillator cavity as the laser output.

40. The laser according to claim 38 wherein in h) said dichroic mirror is highly reflective for S-polarized fundamental beam and highly transmissive for preselected wavelength beam and further comprising l) a polarization rotator located between said dichroic mirror and said non linear crystal to rotate the polarization of said fundamental beam ½ wave.

41. The laser according to claim 40 wherein said polarization rotator is a wave plate.

42. The laser for providing a preselected wavelength beam according to claim 41 wherein said first OPO reflective surface and said first laser resonator reflective surface formed by a single mirror, said mirror highly reflective for fundamental beam and at least partially reflective for preselected wavelength beam.

43. A laser for providing a 193 nm beam comprising:
   a) a laser resonator having a laser resonator cavity formed between a first laser resonator reflective surface and a second laser resonator reflective surface, said laser resonator having a resonator optical axis;
   b) a lasing medium located within said laser resonator cavity for generating a fundamental wavelength beam;

c) said lasing medium being a Nd:YAG or a Nd:YVO$_4$ crystal, producing a 1064 nm fundamental beam or an Nd:YLF crystal producing a 1053 nm;

d) an optical parametric oscillator (OPO) cavity formed between said first OPO reflective surface and a second OPO reflective surface said optical parametric oscillator cavity having an oscillator optical axis which is in part separate from said resonator optical axis and which in part overlaps said resonator optical axis;

e) an OPO nonlinear generator for OPO generation located within said OPO cavity along said oscillator optical axis and along said resonator optical axis in optical communication with said first and said third reflective surface; said OPO nonlinear generator oriented to convert said 1064 nm or 1053 nm fundamental wavelength beam into an output wavelength beam having a wavelength of about 1544 nm;

f) means to direct said fundamental wavelength beam into said optical parametric oscillator cavity along said oscillator optical axis and across said OPO nonlinear generator at P-polarization to convert a portion of said fundamental wavelength beam to a 1544 nm output wavelength beam at P-polarization;

g) said optical axes intersecting opposed faces of said OPO nonlinear crystal;

said opposed faces having a Brewster cut at the intersection of said OPO nonlinear crystal and said axes so that the fundamental beam and about 1544 output wavelength beam incident on said crystal at P-polarization within 10 degrees from the Brewster angle for said crystal;

h) said first laser resonator reflective surface reflective of fundamental wavelength beam; and said first OPO reflective surface at least partially reflective of output wavelength beam;

i) means to direct said fundamental and output beams from said first laser resonator reflective surface and from said first OPO reflective surface back through said OPO nonlinear generator to form additional output wavelength beam;

j) a beam separator to separate said 1544 output wavelength beam from said fundamental wavelength beam;

k) fundamental beam directing means to direct said separated fundamental beam back through said lasing medium for further amplification;

l) output beam directing means for directing said separated output wavelength beam to said second OPO reflective surface where said beam is at least partially reflected through said OPO nonlinear crystal;

m) an output coupler to direct a portion of said 1544 nm output wavelength beam on an output path outside said optical parametric oscillator cavity;

n) a first, second harmonic generator located along said output path for converting a portion of said 1544 nm beam to 772 nm beam said first second harmonic generator delivering 1544 nm beam and 772 beam on a first second harmonic output path;

o) a second, second harmonic generator located along said first second harmonic output path, in optical communication with said first second harmonic generator for converting a portion of said 772 nm beam from said first second harmonic generator to 386 nm beam said second, second harmonic generator delivering 772 nm beam and 386 nm beam on a second, second harmonic output path;

p) a third harmonic generator (1 w+2 w=3 w) located along said second, second harmonic output path, in optical communication with said second, second harmonic generator for converting a portion of said 772 nm beam and a portion of said 386 nm beam to 257 nm beam said third harmonic generator delivering 772 nm beam and 257 nm beam on a third harmonic generator output path;

a fourth harmonic generator (1 w+3 w=4 w) in optical communication with said third harmonic generator output path for converting a portion of the 772 nm beam and the 257 nm beam to a 193 nm beam;

said fourth harmonic generator delivering said 193 nm on a fourth harmonic generator output path.

44. The laser for providing a 193 nm beam according to claim 43 further comprising a first polarization rotator located between said second, second harmonic generator and said third harmonic generator for rotating the polarization of either the 772 nm beam or the 386 nm beam ½ wave so that said 772 nm beam and said 386 nm beam have parallel polarization when passing through said third harmonic generator.

45. The laser for providing a 193 nm beam according to claim 44 further comprising a second polarization rotator located between said third harmonic generator and said fourth harmonic generator for rotating the polarization of either the 772 nm beam or the 257 nm beam ½ wave so that said 772 nm beam and said 257 nm beam have parallel polarization when passing through said fourth harmonic generator.

46. The laser for providing a 193 nm beam according to claim 45 further comprising a beam separator located on said fourth harmonic output path to separate said 193 nm beam from other beams of said laser and deliver said 193 nm beam on a preselected output path.

47. The laser for providing a 193 nm beam according to claim 46 wherein said OPO nonlinear generator is a KTP, KTA, RTA, or RTP crystal.

48. The laser for providing a 193 nm beam according to claim 47 wherein said first second harmonic generator is a KTP nonlinear crystal.

49. The laser for providing a 193 nm beam according to claim 48 wherein said second, second harmonic generator is a LBO nonlinear crystal.

50. The laser for providing a 193 nm beam according to claim 49 wherein said third harmonic generator is a BBO nonlinear crystal.

51. The laser for providing a 193 nm beam according to claim 50 wherein said fourth harmonic generator is a BBO nonlinear crystal.

52. The laser for providing a 193 nm beam according to claim 43 wherein said output coupler provides said first or said second OPO reflective surface.

53. The laser for providing a 193 nm beam according to claim 52 wherein said output coupler is 3% to 40% transmissive of 1544 nm beam.

54. The laser for providing a 193 nm beam according to claim 43 wherein said lasing medium is a YAG crystal and said OPO nonlinear crystal is a KTP or KTA crystal.

55. The laser for providing a 193 nm beam according to claim 43 wherein the lasing medium is a Nd:YLF crystal and the OPO nonlinear generator is a KTP crystal.

56. A method of providing a preselected wavelength laser beam comprising:

a) forming a laser resonator having a laser resonator cavity formed between a first laser cavity reflective surface and a second laser cavity reflective surface, said laser resonator having a resonator optical axis;

b) exciting a lasing medium located within said laser resonator cavity to generate a fundamental wavelength beam;
c) forming an optical parametric oscillator (OPO) cavity between a first OPO reflective surface and a second OPO reflective surface, said optical parametric oscillator cavity having an oscillator optical axis which is in part separate from said resonator optical axis and which in part overlaps said resonator optical axis;
d) pumping an OPO nonlinear generator for OPO generation located within said OPO cavity along said oscillator optical axis and along said resonator optical axis in optical communication with said fundamental beam, said fundamental beam incidenting on said OPO nonlinear generator at P-polarization;
said OPO nonlinear generator oriented to convert said fundamental wavelength beam into a P-polarized preselected wavelength beam having a preselected longer wavelength than said fundamental beam;
e) directing said fundamental wavelength beam into said optical parametric oscillator cavity along said oscillator optical axis and through said OPO nonlinear generator to convert a first portion of said fundamental wavelength beam to a preselected wavelength beam having a longer wavelength than said fundamental beam;
f) said optical axes intersecting opposed faces of said OPO nonlinear generator; said opposed faces having a Brewster cut at the intersection of said OPO nonlinear generator and said axes so that the fundamental beam and the preselected wavelength beam incident on said OPO nonlinear generator within 10 degrees from the Brewster angle for said generator;
g) reflecting said fundamental wavelength beam and at least partially reflecting said preselected wavelength beam back through said OPO nonlinear generator at P-polarization to oscillate said reflected preselected wavelength beam and to convert a second portion of said fundamental laser beam to preselected wavelength beam;
i) separating said preselected wavelength beam from said fundamental wavelength beam;
j) directing said separated fundamental beam back through said lasing medium for further amplification;
k) reflecting at least a portion of said separated preselected wavelength beam through said OPO nonlinear generator.

* * * * *